Aug. 20, 1957     H. A. COUGHLIN     2,803,078
MACHINE FOR FINISHING PHOTOLITHOGRAPHIC PLATES
Filed Nov. 12, 1954     7 Sheets-Sheet 5

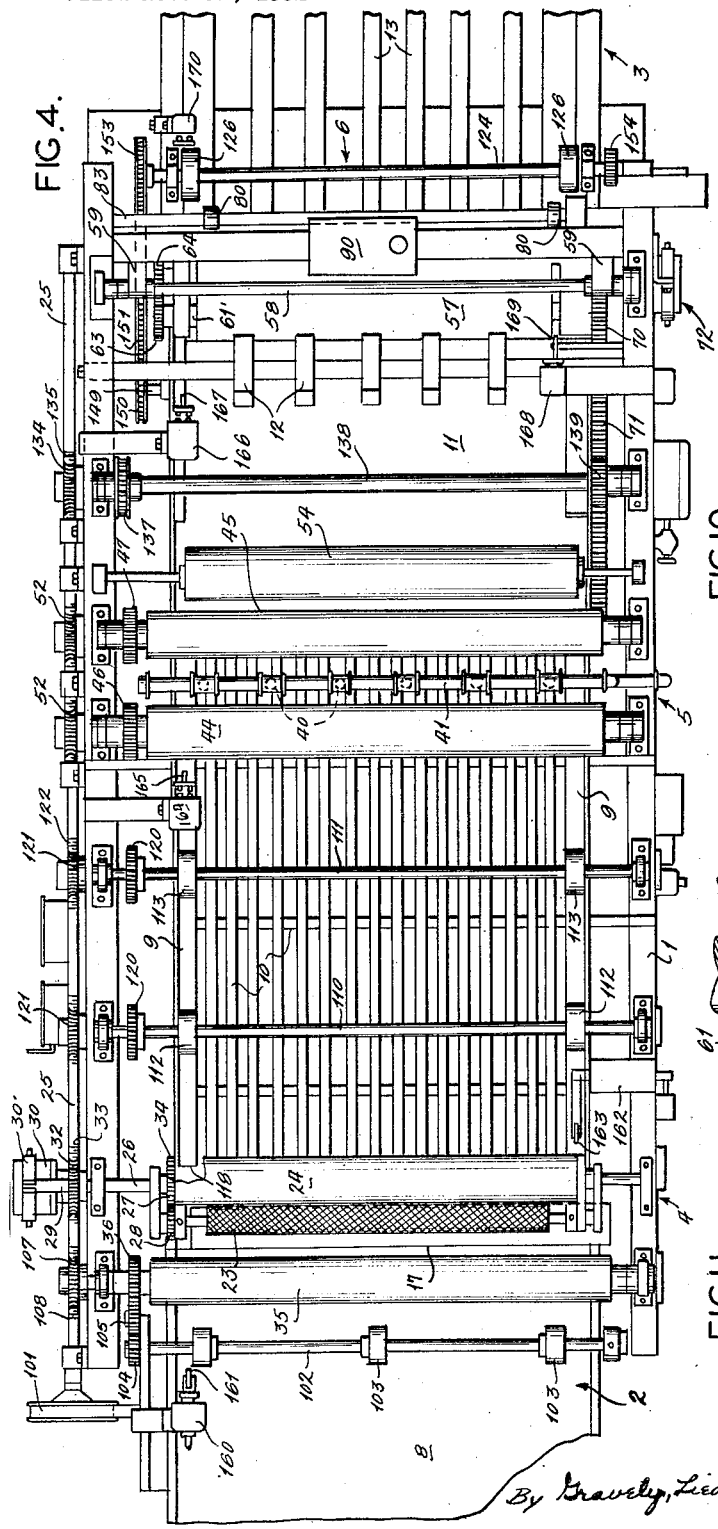
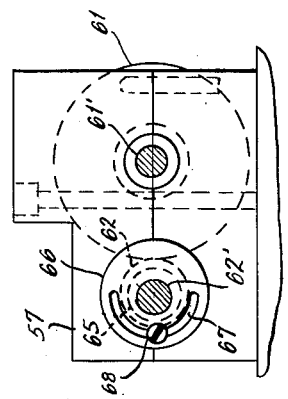
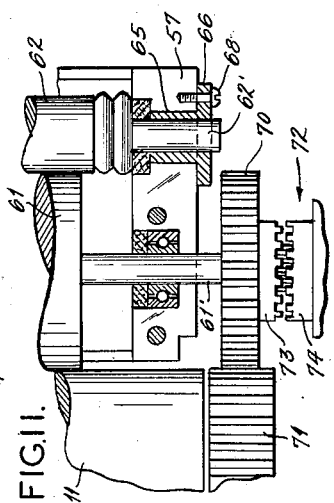
FIG. 4.
FIG. 10.
FIG. 11.
INVENTOR.
HARRY A. COUGHLIN
By Gravely, Lieder, Woodruff & Wills
ATTORNEYS.

INVENTOR.
HARRY A. COUGHLIN
By Gravely, Lieder, Woodruff & Wills
ATTORNEYS.

Aug. 20, 1957 H. A. COUGHLIN 2,803,078
MACHINE FOR FINISHING PHOTOLITHOGRAPHIC PLATES
Filed Nov. 12, 1954 7 Sheets-Sheet 6

INVENTOR.
HARRY A. COUGHLIN
By Gravely, Lieder, Woodruff & Wills
ATTORNEYS.

Aug. 20, 1957  H. A. COUGHLIN  2,803,078
MACHINE FOR FINISHING PHOTOLITHOGRAPHIC PLATES
Filed Nov. 12, 1954  7 Sheets-Sheet 7

INVENTOR.
HARRY A COUGHLIN
By Gravely, Lieder, Woodruff &
Wills  ATTORNEYS

United States Patent Office 2,803,078
Patented Aug. 20, 1957

2,803,078

MACHINE FOR FINISHING PHOTOLITHO-GRAPHIC PLATES

Harry A. Coughlin, St. Louis, Mo., assignor to John S. Swift & Co., Inc., St. Louis, Mo., a corporation of Missouri Application November 12, 1954, Serial No. 468,382

7 Claims. (Cl. 41—9)

This invention relates generally to the developing and finishing of photolithographic plates, and more particularly to a novel machine for and process of finishing photolithographic plates so as to make them ready for use.

In the production of photolithographic printing press plates, a zinc plate is coated in known manner with a light sensitive solution of albumen and ammonium bichromate, and the matter to be printed from a photographic negative is reproduced onto the light sensitized plate. The exposed printing areas of the sensitized coating are hardened by the light and are rendered insoluble in water, while the unexposed or non-printing areas of said coating are not hardened and are soluble in water.

In the past the preparation of photolithographic plates after exposure to light has been totally a hand operation involving great time consumption and resulting in excess use and waste of materials and unpredictable quality of the finished plate. The H. A. Coughlin Patent Nos. 2,555,874, dated June 5, 1951, and 2,677,320, dated May 4, 1954, have provided labor and time saving apparatus for the uniform application of materials in inking, drying and partly developing photolithographic plates. The present invention constitutes a process and machine for practicing the process, all of which is additional to the subject matter of said patents.

Heretofore, after developing the exposed photolithographic plate, which is carried out by methods resulting in a wet plate, the practice has been to squeegee the plate and apply an etching solution to the non-printing areas of the surface of the plate whereby such substances as greasy ink will not adhere thereto. The etching solution is applied with a hand brush, which is dipped into a bowl containing the solution and the solution is brushed over the plate surface until the operator feels the job is satisfactory. The etched plate is then washed with water and squeegeed preparatory to applying a coating of gum arabic. The gum arabic is applied to the surface of the plate with a sponge, then rubbed with a cloth until the gum starts to dry. The gummed surface is fanned dry, then the back of the plate is dried with a cloth.

This hand finishing process is well known in the art to be a slow and arduous operation requiring a large stock of rubbing towels. The hand operation also results in the dilution of etching solution, loss of all the gum arabic adhering to the towels, and the non-uniform or unpredictable quality of the finished plate.

It is an object of the present invention, therefore, to provide a novel automatically operating photolithographic plate finishing machine in which a plate or plates are automatically finished by a plurality of separate and distinct devices that are cooperatively associated together in the machine, and such devices perform different, successive functions on the plate or plates as the same are moving through the machine.

Another object of the present invention is to provide a machine which will rapidly and efficiently etch, wash, apply gum arabic, and dry photolithographic plates in one continuous operation without requiring the operator to touch the plate or be in close proximity thereto during such operations.

Still another object is to provide a process of preparing photolithographic plates whereby a continuous flow of undiluted chemicals in precisely the required amount is evenly applied to the plate surface in successive stages of operation, and proper reaction time of the chemicals is permitted.

A further object of the present invention is to provide an apparatus for and process of finishing photolithographic plates, wherein mechanical means for the application of chemicals is provided thereby assuring definite and positive uniform treatment to each and every plate surface.

A still further object is to provide a machine for conditioning photolithographic plates to receive a coating of gum arabic, and including means for automatically applying a uniform coating of gum arabic to the imaged surface of each of the plates.

These and other objects and advantages will become apparent hereinafter.

The invention comprises an automatically operating machine for and a method of finishing photopithographic press plates in one continuous operation including the steps of etching, washing, applying a gum coat and drying the plates. More specifically, the invention comprises improved roller means for applying a uniform layer of gum arabic to photolithographic plates, and conveying means for supporting and carrying the plates through the machine.

The invention further consists in the process, and in the parts and in the arrangements and combinations of parts hereinafter described and claimed. In the accompanying drawings which form part of this specification and wherein like numerals refer to like parts wherever they occur:

Fig. 4 is a top plan view of the photolithographic plate finishing machine with certain parts, such as the etching feeder tank, not shown so as to reveal the details thereof.

Figure 2:
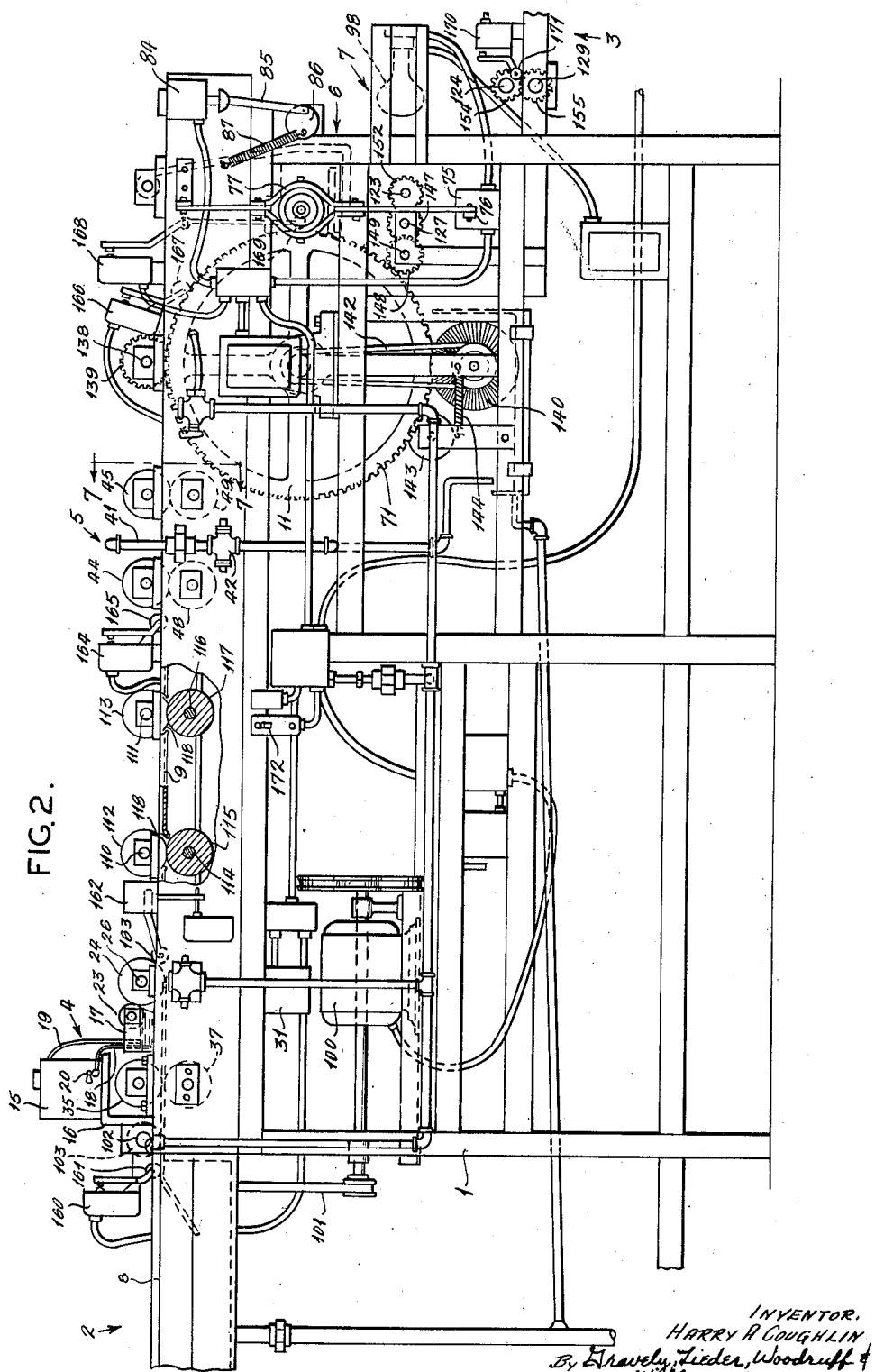
Fig. 2 is a side elevational view partly broken away and showing the details of the machine.
Figure 5:
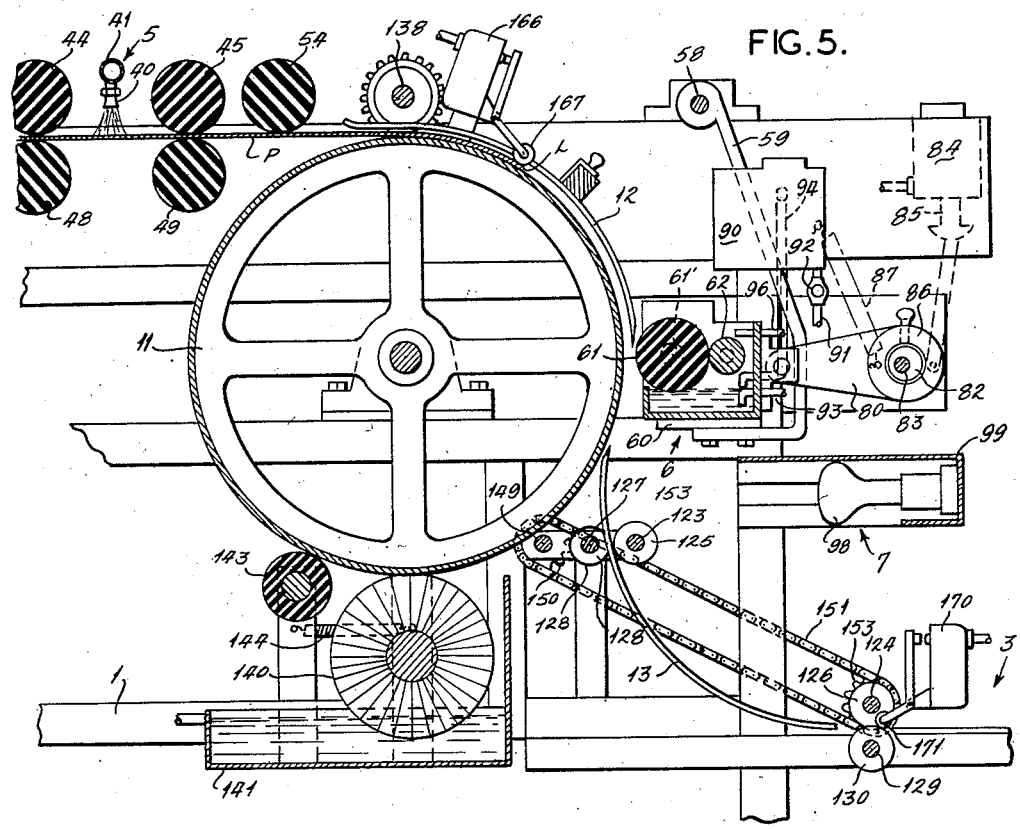
Figure 8:
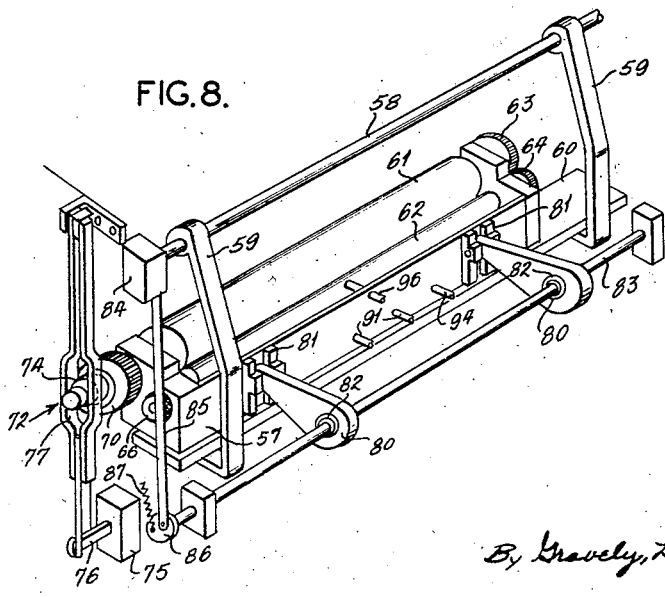
Figure 6:
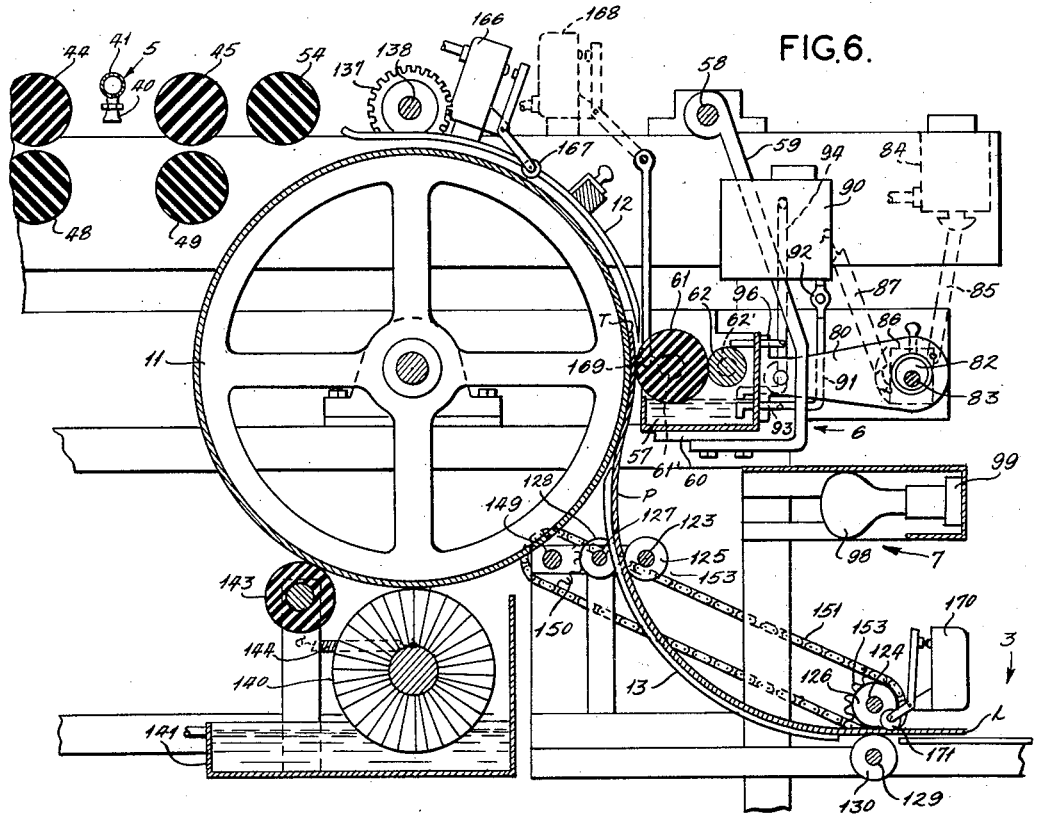
Figure 9:
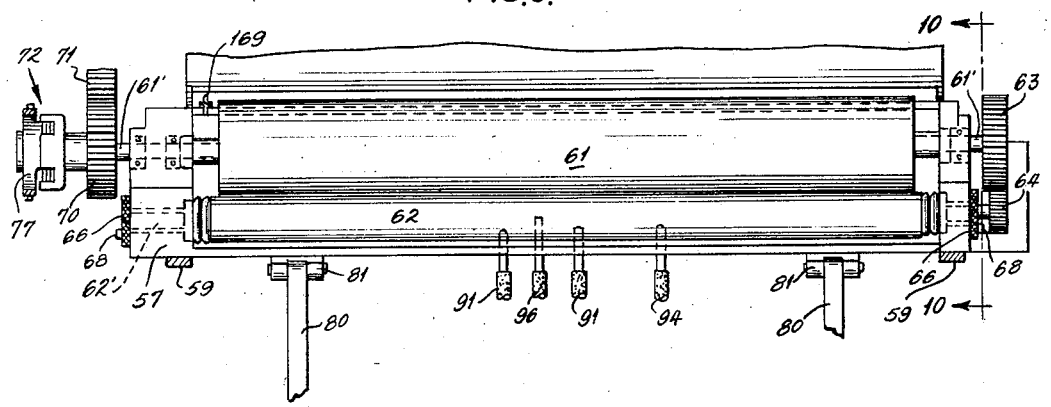

Fig. 5 is an enlarged fragmentary side elevational view partly in section showing a photolithographic plate approaching the gum applying stage of the process, Fig. 6 is a view similar to Fig. 5 showing the photolithographic plate completing its passage past the gum applying stage, Fig. 7 is a fragmentary transverse elevational view of the gearing for driving the roller sets, the view being taken along line 7—7 of Fig. 2, Fig. 8 is a fragmentary perspective view of the gum fountain shown in Figs. 5 and 6, Fig. 9 is a fragmentary top plan view of the gum fountain.

Figures 12, 13:
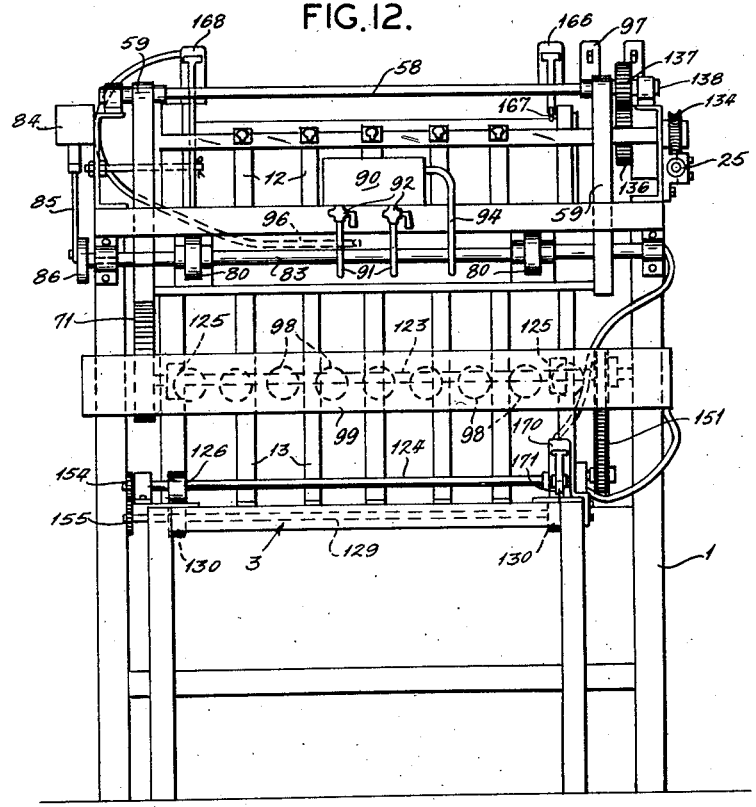

Fig. 10 is an enlarged end elevational view of the gum applicator roller and the distributor roller associated therewith taken along line 10—10 of Fig. 9, Fig. 11 is an enlarged view partly in section of the gears and clutch driving the applicator roller similar to Fig. 9, Fig. 12 is an end elevational view of the delivery end of the machine, and Fig. 13 is a wiring diagram showing a relay system for the photolithographic plate finishing machine.

For the purposes of disclosure, the photolithographic plate finishing machine will be described as if constructed specifically for the treatment of press plates having a predetermined length and width. However, the machine may be adapted for the treatment of any size of photolithographic plate, as will become apparent hereinafter; and although this machine will process any number of plates whether they are in abutting or spaced relation, the description will disclose the machine with regard to the processing of one plate P having a leading edge L and a trailing edge T.

The photolithographic plate finishing machine is adapted to treat the plate P in a series of steps and in one automatic and continuous operation as the plate P is moved through the machine. The steps in the processing of the plate P include etching, washing, applying a coating of gum, and drying; and different devices are provided in the machine for performing these processing steps. The machine includes individual operating means, which may be in the form of micro-switches, positioned adjacent each of the devices and operatively connected thereto so that as the plate moves through the machine its leading edge L will set into operation successively each of the devices by contacting the operating means operatively associated therewith, and before the preceding device terminates its period of operation another or the next device is brought into operation. As each plate P is passed through each processing device, the devices will automatically drop out or cease to function until put into operation again by the leading edge L of the next plate contacting the operating means for the devices. The machine also includes power operated means, such as an electric motor, connected with each of the aforesaid devices and the operating means therefor and, additionally, with means for continuously moving the plate through the machine.

Figure 1:
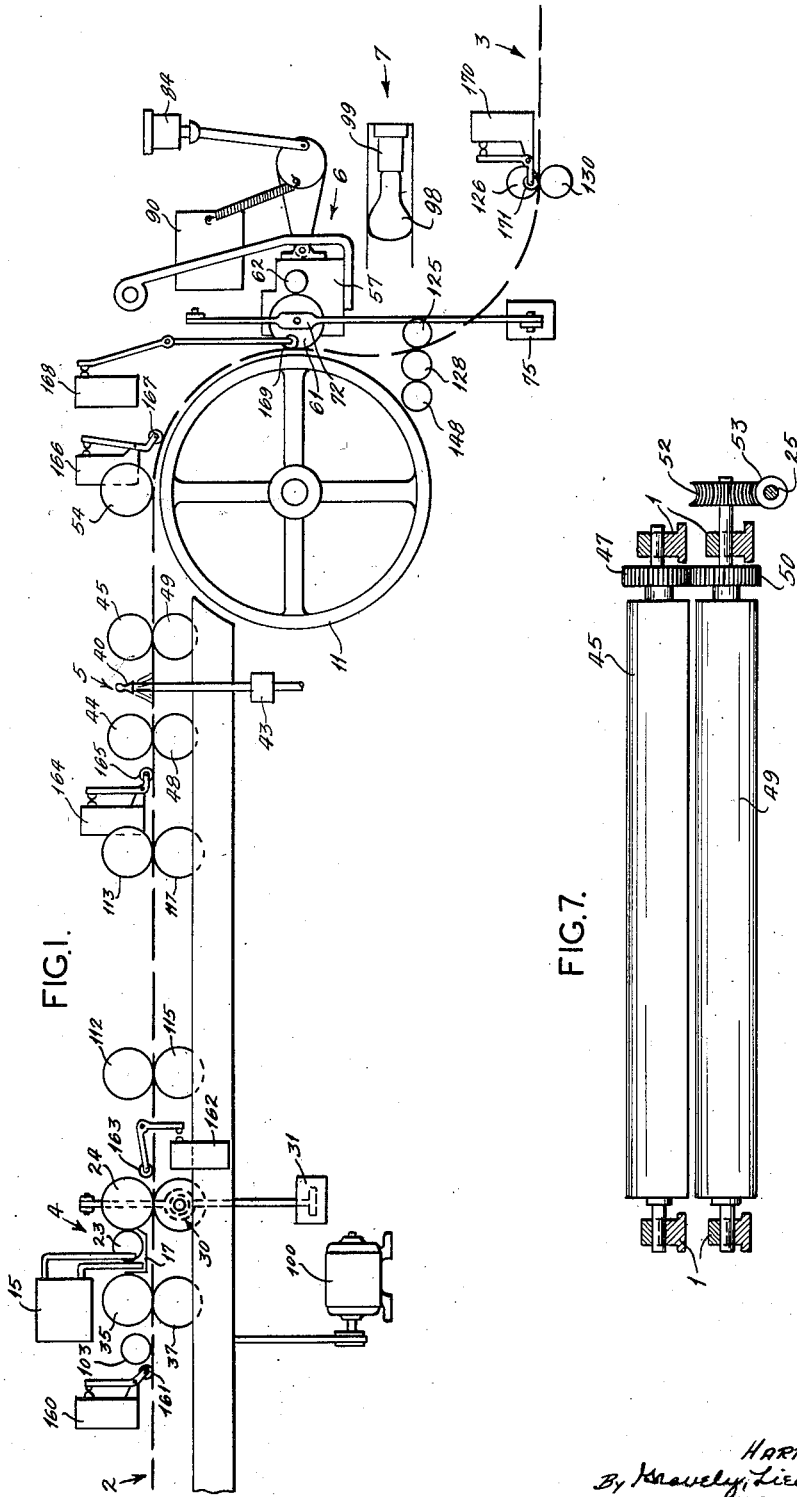
Fig. 1 is a diagrammatic view of a presently preferred photolithographic plate finishing machine.
Figure 3:
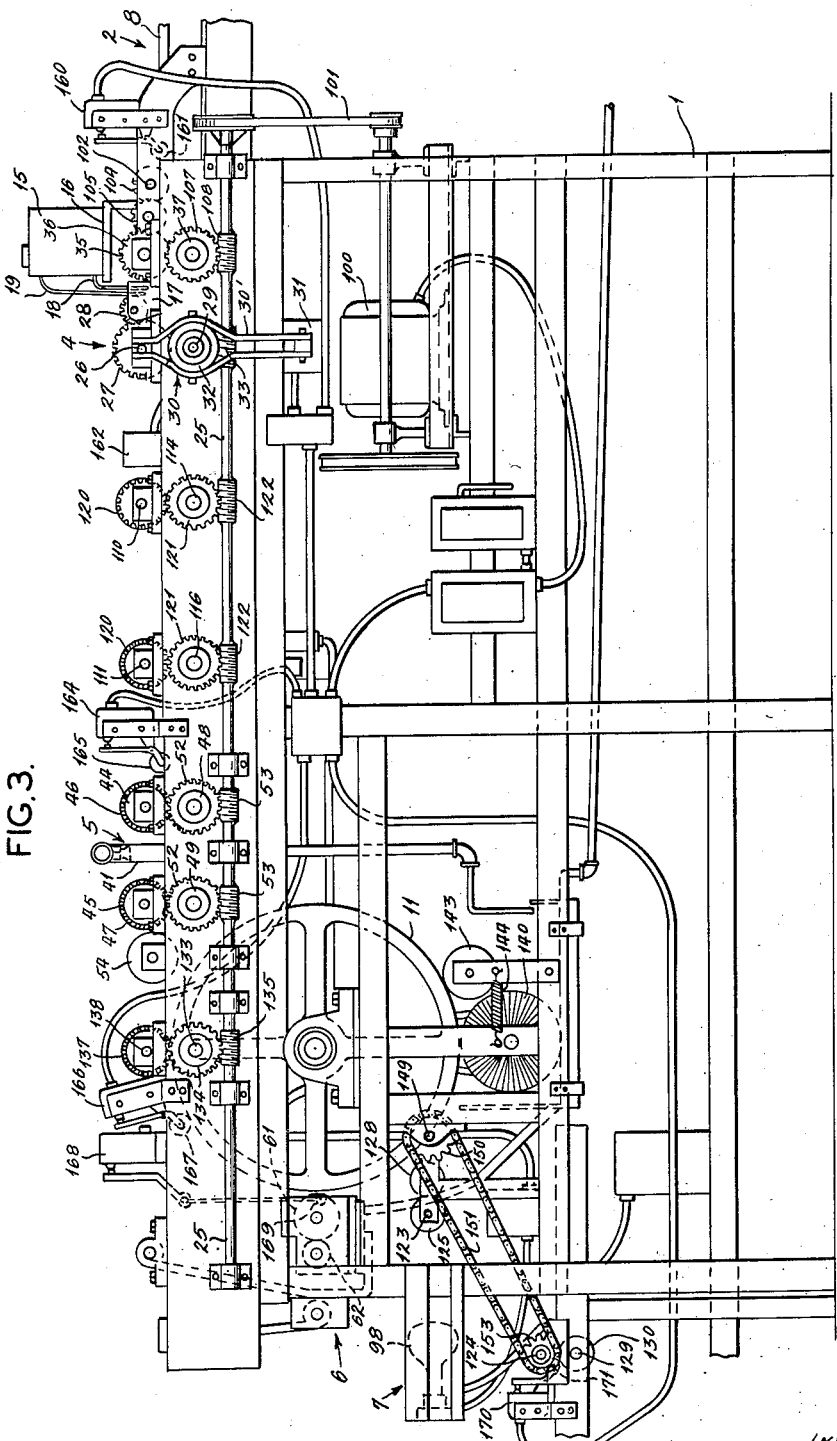
Fig. 3 is a side elevational view taken from the side of the machine opposite to that of Fig. 2.

Referring to Figs. 1, 2 and 3 of the drawings, it will be seen that the several devices and agencies have been shown mounted on suitable supporting means, such as a frame 1. The frame has a plate receiving station 2 at the front end, and a plate delivery station 3 at the aft end. An etching device 4, a washing device 5, a gum applying device 6, and a drying device 7 are respectively positioned between the receiving station 2 and the delivery station 3.

The path of travel of the plate P, indicated by dash lines in Fig. 1, from the receiving station 2 to the delivery station 3 is defined by suitable supporting structure mounted on the frame 1 (Fig. 4). A supporting table 8 provided at the receiving station 2 extends forwardly to adjacent the etching device 4 for supporting the plate P when it is initially placed in the machine. The supporting structure adjacent the etching device 4 and extending from the table 8 to adjacent the washing device 5 includes two longitudinally extending L-shaped guideways 9. The upturned or vertical portion of each guideway 9 confines the plate P to the intended direction of travel, whereas the bottom or horizontal portions thereof support the outer edges of the plate, the horizontal flanges being suitably interrupted to accommodate roller means hereinafter described. Positioned between the guideways 9 is a grid type supporting structure 10, which may be constructed of any acid resisting material, preferably metal.

A platen or drum 11 is suitably journaled in the frame 1 adjacent the delivery end of the machine and is provided to support the plate P during movement forward and downward about its periphery from adjacent the washing device 5 to the gumming device 6 (Figs. 5 and 6). Arcuate fenders 12 (Figs. 4, 5 and 6) conforming to the circumferential curve of the platen 11 are positioned outwardly therefrom and extend from adjacent the washing device 5 to adjacent the gumming device 6. The fenders 12 are provided to direct the plate P downwardly and forwardly about the platen 11. Extending downwardly from adjacent the gumming device 6, past the drying device 7 to the delivery station 3 are strippers 13 formed in a reverse curve of the fenders 12, so as to reverse the curvature of the plate P and direct the plates P forwardly as well as downwardly to the delivery station 3.

The following detailed description will be directed to the process and to the mechanical and electrical means by which the process may be carried out.

*Process*

As set out hereinbefore, one of the purposes of the machine is to provide an automatically operated mechanical means for processing a photolithographic plate after the plate has been coated with a light sensitive substance and then exposed to light to reproduce images thereon. The treating of such plates over the exposed areas is first undertaken so that the images are brought out. Before the plate P is ready for use, a coating of gum arabic must be applied to the completely developed surface of the plate for reasons that will appear hereinafter. However, before the gum arabic solution can be applied to the plate, its surface is desensitized by the application of an acidic etching solution, which is then removed before the coating of gum arabic is applied.

The process for finishing plates P after they have been developed includes means for applying the etching solution, means for washing to remove the etch after reaction time has been allowed, means for applying the solution of gum arabic to the plate P, and means for drying the gum coating on the plate surface. A description of each phase of the total process will now appear.

*Etching device.*—The etching device 4 (Figs. 2 and 3) comprises an etch solution reservoir or feeder tank 15 mounted on a suitable support 16, which is secured to the frame 1. An etch solution fountain pan 17 is mounted on the frame 1 above the guideways 9 and supporting structure 10 so that the plate P will pass under the fountain pan 17 when moving through the etching device 4. A lower feeder tube 18 conducts the etch solution from the feeder tank 15 to the fountain pan 17, and is attached at the bottom of the feeder tank and opens into the fountain pan 17 below the fluid level to be maintained in the fountain pan. An upper feeder or air tube 19 is connected adjacent the top of the feeder tank 15 and extends downwardly into the fountain pan 17 so that its open lower end will be at the precise level the solution is to be maintained. The feeder tank 15 is hermetically sealed and the vacuum in the tank is utilized in maintaining the fluid level in the pan 17 at the level where equilibrium is established. A shut off valve 20 is provided in the lower feed tube 18 so that flow of etch solution to the fountain pan 17 may be shut off when the feeder tank 15 is being filled.

An etch solution distributor roller 23 (Figs. 2, 3 and 4) having a knurled surface is suitably positioned in the fountain pan 17 so that the lower edge of the distributor roller 23 is beneath the level of the etching solution. The knurled surface of the distributor roller 23 is provided to lift the etch from the fountain pan 17 and distribute it evenly on an applicator roller 24, the distributor roller 23 being in continuous surface contact therewith. The lower edge of the applicator roller is positioned in the line of movement of the photolithographic plate so that as the plate moves through the etching device 4 its surface is contacted by the applicator roller and etching solution is deposited thereon. The applicator roller 24 may be covered with wool plush or the like, and is suitably geared to have rapid rotation compared to the speed of the plate P moving through the etching device 4 so that the roller 24 will have a brushing effect in applying the etching solution to the plate surface.

As will be seen throughout the description, a main drive shaft 25 is provided to transmit motion from a power source to each of the rotational means in this machine. The etching device 4 is normally inoperative, but has means operatively connected therewith so that as a plate P is started through the machine the etch applicator roller 24 will be activated and will continue to operate until the plate has passed completely under the roller 24.

The applicator roller 24 is mounted on a shaft 26, which is journaled in bearings carried by the frame 1. A spur gear 27 is secured to the shaft 26 adjacent one end and is meshed with a spur gear 28 attached to the distributor roller 23. Therefore, when the applicator roller 24 is operative, the distributor roller 23 will rotate and distribute a continuous supply of fresh etching solution on the applicator roller. If desired a free running supporting roller (not shown) may be provided under the applicator roller 24 for supporting the plate P, instead of the supporting structure previously described as being provided therefor.

The medium employed for gearing the applicator roller 24 to the main drive shaft 25, and for activating the roller 24 from an inoperative condition is a clutch 30 (Figs. 3 and 4) and a solenoid 31 (Figs. 1, 2, 3 and 13). The clutch 30 may include a shiftable member (not shown) spline connected to a shaft 29 and positioned to be shifted by a yoke 30', which is activated by the solenoid 31. A worm wheel 32 meshed with its worm 33 on the drive shaft 25 is formed to be engaged by the shiftable member for causing the rotation of the shaft 29. The shaft 29 carries a spur gear 34, which meshes with gear 27 on the applicator roller shaft 26. Therefore, when the solenoid 31 is energized, the spline mounted shiftable member engages the worm wheel 32 of the clutch 30 and motion is transmitted from the main drive shaft 25 to the applicator roller shaft 26.

The etching device 4 also includes a squeegee roller 35 journaled in the frame 1 beneath the feeder tank platform 16 and having a spur gear 36 secured thereto adjacent one end. A supporting or backup roller 37 is journaled in the frame 1 in vertical alignment beneath the squeegee roller 35, and has a spur gear (not shown) positioned inwardly of one end and meshed with the spur gear 36 on the squeegee roller 35. The squeegee roller 35 removes excess moisture from the plate surface when the wet plate P is started through the etching device 4, and the supporting roller 37 supports and drives the plate while it is being squeegeed. The gearing and operation will be more fully described hereinafter.

*Washing device.*—The washing device 5 (Figs. 2, 3 and 4) is spaced from the etch applying device 4 a distance calculated to provide the etching solution a predetermined time for reaction on the surface of the plate. The washing device 5 comprises conventional type sprayheads 40 (Figs. 4, 5 and 6) mounted in a water conduit 41 positioned above the frame 1 so as to direct a spray of water downwardly on the etched surface of the plate P when the washing device 5 is in operation. Positioned in the conduit 41 is a shut off valve 42 which is operated by the energization of a solenoid 43 (Figs. 2 and 13), the operation of which will be described hereinafter. A squeegee roller 44 is positioned adjacent spray-heads 40 so that when a plate P is being processed, the roller 44 will squeegee the etching solution from the plate surface immediately before the plate P enters under the sprayheads 40. Positioned adjacent to the spray-heads 40 on the opposite side from the roller 44 is a squeegee roller 45, which removes excess water from the plate surface 45 after the washing process has been completed, thus leaving the plate damp dry and ready for entering the gumming device 6. The roller 44 and 45 are suitably journaled in the frame 1 and have spur gears 46 and 47 (Fig. 3) at one end thereof. Supporting or backup rollers 48 and 49 are journaled in the frame 1 beneath the rollers 44 and 45, respectively for resiliently supporting the plate P while its upper surface is being squeegeed by the rollers 44 and 45, and the rollers 48 and 49 squeegee the lower surface. Each of the backup rollers 48 and 49 has a spur gear 50 (Fig. 7) inwardly of one end, and meshed with spur gears 46 and 47 on the squeegee rollers 44 and 45. The outer ends of the backup rollers 48 and 49 have worm wheels 52 mounted thereon in engagement with worms 53 mounted on the drive shaft 25 so that when the shaft 25 is rotated, the backup rollers 48 and 49 will be driven thereby and the squeegee rollers 44 and 45 will be rotated by the gearing provided therefor (Fig. 7). The gear train just described and illustrated in Fig. 7 represents a typical power transfer means used in connecting the several drive and squeegee rollers to the main drive shaft 25, as will become apparent later. All of the rollers are geared to the drive shaft 25 in the same ratio so that they will turn at the same speed to prevent slippage of the plate P while moving through the machine. The rollers 44, 45, 48 and 49 also serve to move the plate P forward in its path of movement through the machine. A free running fabric covered roller 54 may be positioned adjacent to the roller 45 for removing any ridge of water remaining on the trailing edge T of the plate P after it has passed under the roller 45.

*Gumming device.*—Gum arabic, per se, is well known in the art to be a substance of great value in photolithographic plate finishing inasmuch as a proper coating of gum on the plate surface will prevent oxidation of the bare metal at the non-printing areas, the printing areas being protected by the developed albumen images. In the developing process the printing areas or images are impregnated with an oily or greasy substance such as printer's ink, which is not removed by the etching solution and to which gum arabic will not adhere. Conversely, printer's ink will not adhere to gum arabic and so by coating the non-printing areas with gum, the images or plate design may be clearly reproduced.

The application of gum arabic is a critical step or operation in the preparation of plates P because if the gum is applied too heavily the plate may be ruined in the subsequent processing of half-tones or solids, and if the gum is applied too thinly the plate P may become oxidized, which permits the non-printing areas to pick up ink thereby making the plate unuseable. In the hand processing of photolithographic plates, as herein noted, these factors were much more acute because the evenness of application of the gum was dependent upon the skill of the operator and it is apparent that a thin or thick area is just as ruinous to the plate as if the entire surface were gummed too thickly or thinly. Therefore, the automatic gumming device 6 has been devised to assure evenness of application and, as will presently be seen, means are provided therein to vary the amount of gum placed on the plate surface.

The gumming device 6 comprises a fountain 57 (Figs. 5, 6 and 8) hung from a pivot rod 58 mounted in suitable bearings secured to the frame 1, the rod being arranged crosswise of the frame 1. The fountain 57 is pivotally secured to the rod 58 by hangers 59 which are fastened to a bottom plate 60 upon which the fountain 57 is positioned. The fountain 57 has an applicator roller 61 positioned therein adjacent to the platen or drum 11 and movable into surface contact therewith, the roller 61 being mounted on a shaft 61' journaled in the end walls of the fountain 57 and rotatable relative thereto. The axes of the drum 11 and the applicator roller 61 are arranged in a horizontal plane so that the latter will contact the plate P positioned therebetween in its movement through the machine.

The applicator roller 61 is positioned in the fountain 57 so that its lower edge will be below the level of the solution of gum arabic maintained in the fountain 57. Also journaled in the fountain is a shaft 62' having a distributor roller 62 mounted thereon, the roller 62 being positioned above the level of the gum and geared in rotatable contact with the applicator roller 61 by meshing spur gears 63 and 64 (Figs. 8 and 9). The function of the distribution roller 62 is to regulate the thickness and the spread of the gum on the applicator roller 61. Manually operative means (Figs. 9, 10 and 11) are provided with the distributor roller 62 to effect its adjustment relative to the roller 61, and include bearings 65 eccentrically positioning the distributor roller shaft 62'. The bearings 65 extend through the outer end walls of the fountain 57 and a flange 66 is formed on the outer end of each of the bearings 65 in movable contact with its respective fountain wall. Each flange 66 has an arcuate slot 67 (Fig. 10) formed therein through which a bolt 68 extends. The bolt 68 is threaded into the outer wall of the fountain 57 so that each bolt may be loosened and the flanges 66 and eccentric bearings 65 rotated, whereby the distribution roller 62 will be moved relative to the applicator roller 61.

The applicator roller 61 is normally inoperative and means are cooperatively associated therewith to cause its rotation relative to the fountain 57. It is apparent that when the applicator roller has been inoperative for a period of time that a coating of gum arabic will become hardened on the roller surface. Therefore, the means for rotating the roller 61, which means is activated by the movement of the plate P, is spaced from the point of contact of the plate by the roller 61 to provide a time lapse sufficient for a fresh coating of gum arabic solution to be picked up by the roller, so that the plate surface will never be contacted by a dry roller.

As shown in Figs. 8, 9 and 11, a spur gear 70 is positioned on the end of the shaft 61' opposite to the gear 63 and is mounted on suitable bearings for rotation relative to the shaft 61'. The gear 70 is meshed with a spur gear 71 extending about the adjacent end of the platen 11 and driven thereby. The outer end of the shaft 61' has a clutch 72 connected thereto, the clutch 72 being similar in construction to the clutch 30 described in the etching device 4. More specifically, the clutch 72 (Fig. 11) has a toothed member 73 secured to the gear 70 and a splined and movable member 74 secured to the shaft 61'. The clutch 72 is controlled by a solenoid 75 (Figs. 8 and 13) so that when energized, the solenoid plunger 76 moves a yoke or clutch shifter member 77 associated with the clutch inwardly to force the movable member 74 into engagement with the toothed member 73. Although the toothed and movable members 73 and 74 are shown in Fig. 11 to be formed with intermeshing teeth, any suitable means of obtaining driving rotation between the gear 70 and the shaft 61' during operational engagement may be provided.

When the clutch 72 is activated and the toothed and movable members 73 and 74 are engaged, the applicator roller 61 will be operative with the spur gear 70, which is always meshed with the gear 71 and in constant rotation during the operation of any phase of the machine. When the clutch 72 is actuated by the solenoid 75, the force of the movable member 74 engaging or meshing with the toothed member 73 would tend to cause axial displacement of the applicator roller 61 and gum fountain 57. Therefore, a thrust member (not shown) may be provided to prevent transverse movement of the fountain relative to the machine, but to allow longitudinal movement of the fountain into and from operative position.

When the gumming device 6 is non-operative, the fountain 57 is swung about the rod 58 so that the applicator roller 61 is spaced from the surface of drum 11. Means are provided for causing horizontal movement of the fountain 57 into plate contacting or operative position and return to non-operative or retracted position. The last mentioned means (Figs. 5, 6, 8 and 9) comprises two arms 80, one end of each arm being connected to a pillow block 81, which is secured to the fountain 57. Eccentrics 82 disposed in the other end of each of the arms 80 are mounted upon a common rotatable shaft 83. A solenoid 84 is mounted on the frame 1 and has a solenoid arm 85 movably positioned therein so that when the solenoid 84 is energized the arm 85 will move, thereby causing a circular drive member 86 to rotate. The member 86 is secured to the shaft 83 and causes its rotation when the member 86 is actuated by the solenoid 84. The rotation of the shaft 83 in the eccentrics 82 causes the horizontal movement of the fountain 57 into plate contacting or operating position, and a spring 87 is expanded thereby, the spring 87 having one of its ends fixed relative to the frame 1 and the other end attached to the member 86 diametrically opposite the attachment of the solenoid arm 85 thereto. When the gumming process has been completed, the solenoid 84 is de-energized and the spring 87 will cause the reverse rotation of the member 86 and the movement of the fountain 57 away from the drum 11 to its inoperative position.

A hermetically sealed gum arabic feeder tank 90 (Figs. 5, 6 and 12) is suitably mounted on the frame 1 above the fountain 57 and serves as a reservoir for the solution of gum arabic. The solution of gum is fed to the fountain 57 from the feeder tank 90 by two feeder tubes 91 having shut-off valves 92. The feeder tubes 91 are attached to the bottom of the tank 90 and enter the fountain slightly below the desired level of the gum solution, which may be done by providing right angle fittings 93 secured to the fountain 57 above the level to be maintained with the right angle portion extending downwardly therefrom. Also connecting the feeder tank 90 with the fountain 57 is an air tube 94, which is connected adjacent the top of the feeder tank 90 and enters the fountain 57 so that its open lower end will be at the precise level the gum is to be maintained. The principle upon which the gum solution is maintained at a given level in the fountain 57 is the same employed in the etching fountain 17 and need not again be explained.

Manually operative means are provided for cleaning the fountain 57 so that when the photolithographic plate finishing machine is not in use the gum arabic will not dry and form a hard crust therein. The washup means comprise a water tube 96 (Figs. 5, 6, 8 and 9) connected to a water supply (not shown) and having a shut off valve (not shown) positioned therebetween.

The water tube 96 is attached to the rear wall of the fountain 57 and extends into the fountain so that its open end is positioned above the applicator roller 61 and the distributor roller 62. When the fountain is cleaned, water runs through the tube 96 and pours into the groove formed between the rollers 61 and 62. A switch 97 (Fig. 12) may be provided to cause the solenoid 75 to be energized and the rollers 61 and 62 to rotate during the wash-up so that the gum adhering to each of the rollers will be removed.

The fountain 57 is drained during the wash-up by conventional means, which are also provided for draining the water used during the operation of the washing device 5.

*Drying device.*—The drying device 7 is provided to dry the coating of gum arabic on the surface of the plate P after the plate has left the gumming device 6. The drying device 7 (Figs. 4, 5 and 12) comprises a battery of horizontally extending infra-red heat lamps 98 mounted in sockets 99. The lamps are positioned vertically downwardly from the gumming device 6 and are electrically connected to be energized when the gumming process is commenced and to be de-energized after the plate P has passed the drying device 7, as will be described hereinafter.

Mechanical

The mechanical means for controlling the movement of the plate P through the machine includes a motor 100 (Figs. 1, 2, 3 and 13), which is powered from a conventional electrical source and operated by electrical switches to be described hereinafter. The motor 100 is secured to the frame 1 and when in operation causes the rotation of drive shaft 25 (Figs. 3 and 4) through conventional coupling, including a drive belt 101. The shaft 25 carries a series of worms which provide power take-off means for each of a plurality of drive rolls, which engage the outer edges of the plate and cause it to move through the machine.

A drive roller shaft 102 journaled in the frame 1 adjacent the receiving station 2 is equipped with spaced drive rolls 103 for engaging the plate when it is initially placed in the machine. A spur gear 104 is mounted on one end of the shaft 102, which is rotated by the engagement of the gear 104 with the spur gear 36 through a connecting idler gear 105. As seen hereinbefore, the spur gear 36 is mounted on one end of the squeegee roller 35 and is meshed with a spur gear (not shown) positioned adjacent to one end of the back-up roller 37. The back-up roller 37 has a worm wheel 107 mounted on its end outwardly from the spur gear, the worm wheel 107 being meshed with a worm 108 mounted on the main drive shaft main drive shaft 25 (Fig. 3).

Two drive roller shafts 110 and 111 journaled in the frame 1 intermediate the etching device 4 and the washing device 5 are provided with drive rolls 112 and 113, respectively.

A drive roller shaft 114 journaled in the frame 1 in vertical alignment with the shaft 110 and having supporting rollers 115 mounted thereon is provided to support and drive the plate P. Another drive roller shaft 116 journaled in the frame 1 in vertical alignment with the shaft 111 is provided with rollers 117 to support and drive the plate P. As shown in Fig. 2, the longitudinal guideways 9 may be formed to provide openings 118 for the rollers 112, 113, 115 and 117. Each of the drive roller shafts 110 and 111 have a spur gear 20 adjacent one end and meshed with a spur gear (not shown) positioned inwardly of one end of each of the drive roller shafts 114 and 116. The outer end of each of the shafts 112 and 116 has a worm gear 121 meshed with a worm 122 mounted on the drive shaft 25 and rotatable thereby.

A drive roller shaft 123 journaled in the frame 1 adjacent the drying device 7 (Figs. 2, 5, 6 and 12), and a drive roller shaft 124 adjacent the delivery station 3 are provided with rolls 125 and 126, respectively, for rotational engagement with the outer edges of the plate P. A roller shaft 127 having rollers 128 mounted thereon is positioned adjacent the drive roller shaft 123 for supporting and driving the plate P as it moves past the drying device 7. A roller shaft 129 having rollers 130 mounted thereon is journaled in the frame 1 in vertical alignment with the shaft 124 for supporting the plate P as it is being moved onto the delivery station 3.

All of the plate moving elements are geared to rotate at the same rate of speed to prevent slippage of the plate P while moving through the machine. The platen 11 is driven through suitable gearing by the drive shaft 25, and rotates at the same rate of speed as the plate moving elements so that the plate P will be supported and moved through the machine at an even rate of speed. The gearing for rotating the platen 11 includes a stub shaft 133 (Fig. 3) journaled in the frame 1 and having a worm wheel 134 mounted on its outer end, the worm wheel 134 being meshed with a worm 135 mounted on the main drive shaft 25. The stub shaft 133 has a spur gear 136 (Fig. 12) mounted inwardly of the worm wheel 134 and meshed with a spur gear 137 mounted adjacent one end of a cross shaft 138, which is journaled in the frame 1 above the platen 11 (Fig. 4). The other end of the cross shaft 138 has a spur gear 139 mounted thereon and meshed with the large gear 71 about the periphery of the platen 11. As seen hereinbefore, the rotation of the gear 71 rotates the platen 11 and is meshed with the spur gear 70, which rotates the applicator roller 61 in the gum fountain 57 when the clutch 72 is energized. The purpose of the platen 11 is to support the plate P while moving in an arcuate path downwardly past the gumming device 6, and especially at the point of contact of the plate by the applicator roller 61 when the fountain 57 is moved into operative position. The actual operation of the gumming device 6 is timed so that the applicator roller will be moved into contact with the leading edge L of the plate P and will be moved out of contact precisely at the trailing edge T thereof. However, during the washup or when examining the machine the applicator roller 61 may be moved into contact with the platen 11 inadvertently and a coating of gum be placed thereon. Therefore, a brush 140 (Figs. 2, 3, 5 and 6) is journaled in the frame 1 adjacent to the platen 11 and in surface contact therewith. The brush 140 has its lower edge positioned in a trough 141 containing water, so that the rotation of the brush 140 against the surface of the platen 11 will constantly wash off any chemical inadvertently adhering to that surface. The brush 140 is driven by a belt 142 (Fig. 2) positioned on a suitable rotatable pully support on the platen 11. A free running squeegee roller 143 is maintained in contact with the surface of the platen 11 to remove excess water therefrom after being washed by the brush 140, proper pressure of the squeegee roller 143 on the platen 11 being maintained by a spring 144 (Figs. 2, 3, 5 and 6).

As seen in Figs. 2, 5 and 6, the rotation of the plate drive roller shafts 123 and 127 is controlled by the gear 71 on the drum 11. The drive roller shaft 127 has a spur gear 147 positioned on one end which is meshed with a spur gear 148 mounted on one end of a cross shaft 149, which is journaled in the frame 1 adjacent to the platen 11. The spur gear 148 is meshed with the gear 71 on the platen, and is provided to impart the proper directional rotation to the shaft 127. A sprocket wheel 150 is mounted on the other end of the cross shaft 149, and is engaged by a sprocket chain 151 for driving the drive roller shaft 124, as will presently be described. The spur gear 147 on the end of the drive shaft 127 is meshed with a spur gear 152 on the adjacent end of the drive roller shaft 123. The drive roller shaft 124 has a sprocket wheel 153 mounted on one end and engaged by the sprocket chain 151, which is driven by the sprocket wheel 150 on the end of the cross shaft 149. Adjacent the other end of the shaft 124 is a spur gear 154 meshed with a spur gear 155 mounted on the adjacent end of the backup roller shaft 129. It is now apparent that the main drive shaft 25 provides the power takeoff means for the rotation of each of the rollers and the drum through various gearing arrangements.

Referring again to Fig. 7 of the drawings, it is further apparent that the gear train provided for squeegee roller 45 and backup roller 49 is typical of the gearing employed for the drive rollers 103, 112, and 113; the squeegee rollers 35, 44 and 45; and the cross shaft 138 for driving the platen 11.

*Electrical*

The automatic operation of the photolithographic plate finishing machine and each successive device for processing the plates treated thereby, is controlled by a series of individual operating means, which may be micro-switches in an electrical circuit.

Referring to Figs. 1, 2, 3, 4 and 13, a switch 160 having a plate contacting roller 161 is positioned at the receiving station 2 for initially setting the machine into operation. The plate contacting roller 161 is positioned adjacent the supporting structure or table 8 for the plate P so that as the plate is moved through the machine, its leading edge L will contact the roller, which acts as a cam follower closing contacts in the switch 160 so that an electrical circuit connected thereto will be energized. Another switch 162 having a plate contacting roller 163 is positioned adjacent the etching device 4 so that as the plate P leaves the etching device the switch 162 will be energized. When the plate P cams the roller 161 to close the contacts of the switch 160, the motor 100 is set into operation thereby activating all of the mechanical means for moving the plate P through the machine. The switch 160 also sets into operation the etching device 4. When the leading edge L of the plate P has moved through the etching device, it will contact the roller 163 thereby closing the electrical circuit through the switch 162. The switch 162 maintains the operation of the motor 100 and the etching device 4 so that when the trailing edge T of the plate P leaves or drops off the roller 161 of the switch 160, both the motor and the etching device will continue to operate until the plate has been etched. When the trailing edge T of the plate has passed the etching device 4, it will drop off switch 162, thereby stopping the operation of the etching device 4 although the motor 100 will continue to operate through electric circuits provided by other switches, as will now be described.

A switch 164 having a plate contacting roller 165 is positioned intermediate the drive roller shaft 111 and the squeegee roller 44 adjacent to the washing device 5 for holding the motor 100 is operation and for setting into operation the washing device 5. A switch 166 having a plate contacting roller 167 is positioned on the periphery of the platen 11. The switch 166 holds the motor 100 and the washing device 5 in operation until it is dropped off by the trailing edge T of the plate P passing from under the roller 167.

The switch 166 also sets the applicator roller 61 of the gumming device 6 into motion by energizing the solenoid 75, which engages the gear 70 with the applicator roller shaft 61'. As previously described, the applicator roller 61 is thus rotated in the fountain 57 so that when the plate is contacted thereby a fresh coating of gum will cover the roller and be deposited on the plate surface. A switch 168, which has a plate contacting roller 169 positioned adjacent the gumming device 6 at the point where the applicator roller 61 will contact the plate P for applying a coating of gum arabic thereto, maintains the operation of the motor 100 and holds the solenoid 75 so that the applicator roller 61 will continue to rotate. In addition, the switch 168 energizes the solenoid 84, thereby moving the applicator roller 61 into contact with the plate surface; and energizes the drying device 7 positioned immediately below the gumming device 6. When the trailing edge T drops off switch 166, the washing device 5 will cease to function, but the switch 168 will hold the gumming device 6 until the trailing edge T drops it off.

A switch 170 having a plate contacting roller 171 is positioned at the delivery station 3 adjacent the drive roller shaft 124 for holding the motor 100 and the drying device 7 in operation. When the plate P has been finished, it will simultaneously pass between drive rolls 126 and 130 and drop off switch 170, so that the machine will cease to operate unless or until another plate is placed in the machine for processing.

Each of the plate contacting rollers 161, 163, 165, 167, 169 and 171 are positioned adjacent to the supporting structure for the plate P in its path of movement through the machine so that the leading edge L of the plate will contact each of the rollers successively, thereby setting into operation one of the devices 4, 5, 6 or 7 as just described.

The electrical circuit (Fig. 13) connecting the switches 160, 162, 164, 166, 168 and 170 with the devices 4, 5, 6 and 7 and with the motor 100 includes a conventional master switch 172 accessibly positioned on the frame 1. The motor 100 is caused to operate by closing any one of the micro-switches, provided the master switch 172 is closed. The operation of each of the devices 4, 5, 6 and 7 and the entire machine will now be described.

Operation

To begin operation, the master switch 172 is thrown to the "on" position, whereby the machine is conditioned for processing a plate P. Actual operation requires the presence of a plate P, so the machine is inoperative when all of the micro-switches 160, 162, 164, 166, 168 and 170 are open.

A plate P, which has been developed and washed, is placed wet on the supporting table 8 (Fig. 4) of the receiving station 2. The plate is then pushed forward until the switch 160 is closed to establish one electrical circuit (Fig. 13) for energizing the motor 100. The motor causes the drive shaft 25 to rotate, in turn, setting in motion the squeegee rollers 35, 44 and 45; the drive rollers 103, 112, 113, 125 and 126; the platen 11; and each of the backup or supporting rollers. The switch 160 also energizes solenoid 31 throwing in clutch 30 thereby causing the etching device 4 to be set in operation and ready to process the plate P.

The plate P is then manually pushed forward until its surface just behind the leading edge L is engaged by the rotating drive rollers 103. The operation of the machine in moving and treating the plate P is, after the first manual push on each plate P, an automatic operation until the plate P is delivered at the delivery station 3.

Referring now to Fig. 1 for the automatic operation of the machine, the rotation of the drive rollers 103 against the plate P moves it forward under squeegee roller 35, which removes excess water from the plate in preparation for the etching device 4. The plate is moved forward into contact with the etch applicator roller 24, which brushes the etching solution onto the plate surface. As the leading edge L of the plate P moves forward past the applicator roller 24, it contacts the roller 163 of switch 162 and moves onto the guideways 9 and supporting structure 10.

When the switch 162 is closed, another electrical circuit (Fig. 13) to the motor 100 is established so that when the switch 160 is disconnected the motor 100 will continue to operate. The switch 162 also closes an auxiliary circuit to the solenoid 31 so that the etching device 4 will continue to operate until the entire plate surface has been treated. The leading edge L of the plate P now moves between the drive rollers 112 and 115, and then between the drive rollers 113 and 117 while the trailing edge T of the plate is dropping off the switch 160 and passing under the drive rollers 103. Further on the leading edge L contacts the roller 165 of switch 164 as the trailing edge T is passing through the etching device 4.

When the switch 164 is energized, the motor 100 will be held in operating condition, as described hereinbefore, and the washing device 5 will be set into operation by the energization of the solenoid 43 opening the shut-off valve 42 in the water conduit 41. As the leading edge L of the plate P passes under the squeegee roller 44, the trailing edge T drops off the roller 163 of switch 162, which de-energizes solenoid 31 thereby disengaging the clutch 30 so as to stop the operation of the etching device 4. The plate P is moved forward at this time by the drive rollers 112, 113 and their cooperating backup rollers 115 and 117 and by the squeegee roller 44 under which the plate has just passed. The squeegee roller 44 removes excess etch solution from the plate surface preparatory to its being washed.

The leading edge L next passes under the spray heads 40 of the washing device 5 and then passes under the squeegee roller 45 which removes residual water from the plate surface. The plate P continues to move forward until the leading edge contacts the fenders 12, which fenders direct the plate P downwardly around the platen 11. As the leading edge L moves downwardly it contacts roller 167 of switch 166, which establishes a circuit to hold the motor 100 and the washing device 5 in operation. The trailing edge T of the plate P eventually drops off the switch 164 and moves forward under the squeegee roller 44 and then under the washing device 5, which is still operating through the auxiliary circuit provided through switch 166.

The switch 166 also energizes solenoid 75, thereby throwing in clutch 72, which causes the applicator roller 61 in the gumming device 6 to rotate through the gum solution preparatory to its being moved into contact with the plate P. The leading edge L of the plate P continues to move downwardly around the periphery of the platen 11 until it contacts the roller 169 of the switch 168.

The roller 169 is positioned at the point of tangency between the platen 11 and the applicator roller 61, which point is on the extended horizontal plane which would cut the axes of both the platen 11 and roller 61. This is also adjacent the point at which the leading edge L of the plate enters on the strippers 13 to commence its reverse curve toward the delivery station 3. The applicator roller 61 is intentionally spaced a small distance from the surface of the plate P to be gummed so that when the switch 168 is closed, the movement of the fountain 57 will bet instantaneous and the applicator roller 61 will contact the plate P precisely at its leading edge L or as close upon the edge L as possible.

It is apparent that the switch 168 is provided to energize the solenoid 84 for moving the fountain 57 and, consequently, the applicator roller 61 into contact with the surface of the plate P. In addition, the switch 168 holds the motor 100 and the solenoid 75 in operating condition, the solenoid 75 being the energizing force for engaging the clutch 72 causing the rotation of the applicator roller 61. Further, the switch 168 completes the electrical circuit to the drying device 7 so that the heat lamps 98 will be lighted.

The leading edge L of the plate P now passes downwardly and forwardly on the strippers 13 where the leading edge L enters between the drive rollers 125 and the supporting rollers 128, which rotate in contact with the outer edges of the plate to drive it into the delivery station 3. The trailing edge T of the plate now leaves the squeegee roller 45 adjacent the washing device 5 and subsequently drops off the roller 167 of the switch 156. As the leading edge L is passing downwardly on the strippers 13, the gum solution on the plate surface is being dried by the operation of the drying device 7. The leading edge L now contacts the roller 171 of the switch 170 and simultaneously enters between drive rollers 126 and supporting rollers 130. When the switch 170 is energized, the motor 100 and heat lamps 98 are held in operating condition. The trailing edge T of the plate P can finally drop off of roller 169 of the switch 168, which instantaneously causes the solenoid 84 to be de-energized so that the fountain 57 will swing to its retracted position and solenoid 75 de-energized so that the clutch 72 will disengage the applicator roller drive gear 70 from the applicator roller shaft 61'. The plate will be moved downwardly past the drying device 7 until the trailing edge T drops off the roller 171 of the switch 170 thereby de-energizing the motor 100 and the heat lamps 98 of the drying device 7 simultaneously.

As pointed out hereinbefore, the photolithographic plate finishing machine will treat any number of plates consecutively, whether they be in abutted or spaced apart relation, and the operation of the machine is automatic, requiring only an operator to feed the plates into the receiving station 2 and to remove them from the delivery station 3.

It is to be understood that the foregoing description and the accompanying drawings have been given only by way of illustration and example, and the changes and alterations in the present disclosure, which will be readily apparent to all skilled in the art, are contemplated as within the scope of the present invention, which is limited only by the claims which follow.

What I claim is:

1. A protective coating applying apparatus comprising a container movable between non-operating and operating positions, said container containing liquid gum arabic; a first roller rotatably positioned in said container; a second roller positioned in said container adjacent to said first roller and rotatably movable in surface contact therewith; and solenoid means in said apparatus adapted to move said container from non-operating to operating position and to rotate said rollers, said first roller being adapted to transfer a layer of gum arabic from said container to a work piece moving past the apparatus.

2. A gum arabic applying apparatus including a hanging container; a sealed reservoir for holding a supply of gum arabic; conduit means between said reservoir and said container for maintaining a predetermined level of gum arabic therein, an applicator roller rotatably positioned in said container to take on and maintain a layer of gum arabic about its periphery; roller means adjacent to said applicator roller with its surface adjustably movable toward and away from said applicator roller for varying the thickness of the layer of gum arabic on the periphery of said applicator roller; and drive means releasably connected to said applicator roller and roller means for causing their conjoint rotation, said container and rollers being movable into gum applying position with a work piece wherein the layer of gum arabic on said applicator roller is transferred to the work piece.

3. In a machine for treating photolithographic plates, a photolithographic plate supporting frame having a plate receiving end disposed in an upper horizontal plane and a plate delivery end disposed in a lower horizontal plane; a plate supporting rotary platen mounted on said frame and having its axis in a horizontal plane intermediate said upper and lower planes; gum arabic applying means movably mounted on said frame adjacent the platen, said gum arabic applying means including a plate contacting roller having its axis in the intermediate horizontal plane of the axis of the platen; and means on said frame adapted to move a plate from the receiving end to the delivery end, said rotary platen supporting the plate from said upper horizontal plane to the intermediate horizontal plane, said plate contacting roller being movable in the intermediate horizontal plane into surface contact with the plate supported by said platen, as the plate passes through the intermediate horizontal plane.

4. In a machine for treating photolithographic plates, a photolithographic plate supporting frame having a rotary platen mounted thereon, a plate receiving station at one end of said frame and disposed in an upper horizontal plane substantially tangential to the upper periphery of the platen, a plate delivery station at the other end of said frame and disposed in a lower horizontal plane adjacent the lower periphery of the platen, the axis of said platen lying in a horizontal plane intermediate said upper and lower planes; means cooperatively associated with said platen in said frame for moving photolithographic plates successively from said plate receiving station to said plate delivery station, said platen supporting said plates in their descending movement from said upper horizontal plane to the lower horizontal plane; and a gum applying device mounted in said frame and having a gum applying roller for applying a coating of gum on the surface of the plates as they pass through said machine, the axis of said gum applying roller being disposed in said intermediate horizontal plane, said plates passing through said machine being caused to move through a vertical plane perpendicular to the intermediate horizontal plane and tangential to the periphery of the platen, said gum applying roller being spaced from said vertical plane in non-operating position and movable in the intermediate horizontal plane into surface contact with the plates while supported in said vertical plane by said platen.

5. In a machine for treating photolithographic plates, a plate supporting frame having a plate receiving end and a plate delivery end in spaced relationship, a plate supporting platen on said frame intermediate said receiving and delivery ends, gum applying means movably mounted on said frame adjacent to said platen, said gum applying means including a plate contacting roller rotatable in a source of gum arabic, and means on said frame adapted to move the plate from the receiving end past said platen to the delivery end, said roller being movable into surface contact with the plate while moving past said platen.

6. In a machine for treating the developed surfaces of photolithographic plates, an ecthing solution applying apparatus including a container for the etching solution, etching solution supply means for maintaining said solution in said container, a first etch roller rotatably positioned adjacent said container, and a second etch roller positioned in said container adjacent to said first etch roller and in surface contact therewith, said second etch roller being adapted to rotate through the etching solution in said container for carrying etching solution from said container to said first etch roller, said first etch roller having a wool plush surface and being adapted to contact the surfaces of the plates to apply the etching solution uniformly thereto for de-sensitizing the non-printing areas of the plate surfaces; washing means spaced from said etching solution from the surfaces of the plates; a gum arabic applying apparatus spaced from said washing means and including a second container for liquid gum arabic, means for maintaining said gum arabic in said second container, a first gum roller rotatably positioned in said second container in contact with the gum arabic therein, a second gum roller rotatably positioned in said second gum container adjacent to said first gum roller, and means for adjusting said second gum roller relative to said first gum roller for varying the thickness of gum arabic on said first gum roller, said first gum roller being movable into surface contact with the etched and washed surfaces of the plates for applying a uniform coating of gum arabic to the non-printing areas of the plate surfaces.

7. The etching solution applying apparatus according to claim 6 wherein the plates are adapted to move past said first etch roller, and said first etch roller is geared for rapid rotation relative to the speed of movement of the plates therepast.

References Cited in the file of this patent
UNITED STATES PATENTS

| | | |
|---|---|---|
| 687,481 | Kammerer et al. | Nov. 26, 1901 |
| 1,282,950 | Reifsnyder | Oct. 29, 1918 |
| 1,552,554 | Goss | Sept. 8, 1925 |
| 2,485,428 | Bleier et al. | Oct. 18, 1949 |
| 2,545,539 | Belluche et al. | Mar. 20, 1951 |
| 2,555,874 | Coughlin | June 5, 1951 |
| 2,651,283 | Zinn | Sept. 8, 1953 |